INVENTOR
JOSEPH W. MILES
BY William Lang
ATTORNEY

Jan. 17, 1956  J. W. MILES  2,731,524
PROTECTIVE SYSTEMS FOR TIME RECORDER MOTORS
Filed March 6, 1952  2 Sheets—Sheet 2
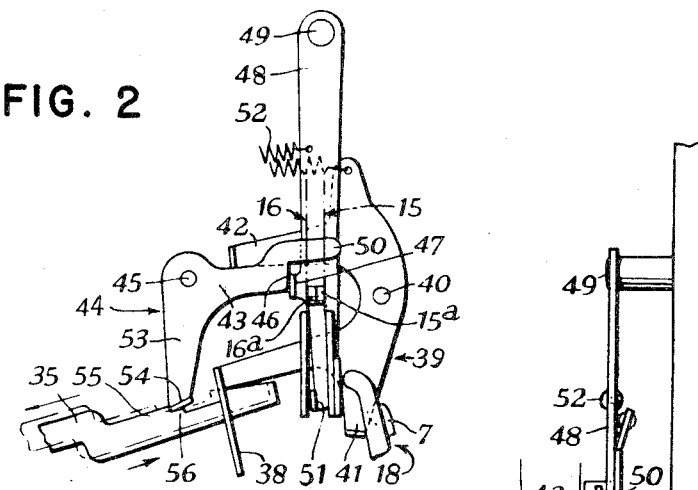
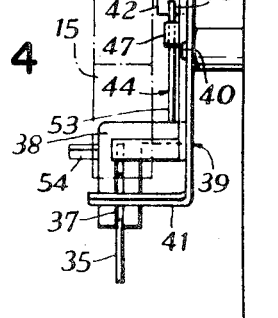
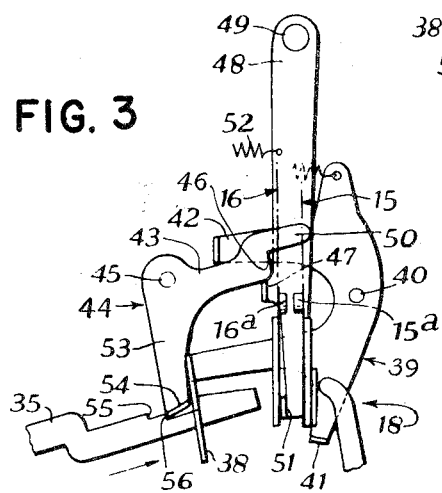
INVENTOR
JOSEPH W. MILES
BY
*William Lang*
ATTORNEY United States Patent Office 2,731,524
Patented Jan. 17, 1956

2,731,524

PROTECTIVE SYSTEMS FOR TIME RECORDER MOTORS

Joseph W. Miles, East Molesey, England, assignor to International Business Machines Corporation, New York, N. Y., a corporation of New York Application March 6, 1952, Serial No. 275,104

Claims priority, application Great Britain March 14, 1951

3 Claims. (Cl. 200—33)

This invention relates to protective systems for electric motors and has for its object the provision of means which are adapted to operate automatically to isolate an electric motor in the event of abnormal circumstances arising which are likely to cause the motor to stall, thereby preventing burning of the motor due to current overload.

The motor protective system according to this invention is in the form of a mechanical interlock or contact breaker for cooperating with one or more control elements associated with the motor, and applies in cases where one at least of said control elements after moving from an inoperative position to an operative position tends to remain in the operative position so long as the motor is energized.

Accordingly it is the principal object of this invention to provide a mechanical interlock which is adapted to be operated automatically during the cycle of a machine associated with the protected motor so as to effect a motor cut-out operation, despite the fact that one at least of the control elements tends to retain its operative position.

The mechanical interlock according to this invention is particularly adapted for use as a protective means for the electric motor of a motorized machine which incorporates an operating part having a periodic translatory movement of an oscillatory or reciprocatory character, such periodic translatory movement resulting, for instance, from the production or the reception by the machine of electric impulses at regular time intervals, such as one minute intervals. It is therefore the object of the invention to provide a mechanical interlock operating with a prearranged time lag so that two or more translatory movements of the said operating part must needs be performed before the motor cut-out operation actually takes place.

A form of motorized machine to which the present invention is readily applicable for motor protection purposes is a time recorder of the type in which a card is inserted to receive an automatic time registration thereon. In some constructions of such time recording machines impulses from a master clock or other timing device cause energization of electromagnetic means periodically to operate interconnecting mechanism for tripping clutching means or alternatively the clutching means is operated by a synchronous motor.

In the impulse-operated machine an electric motor, hereinafter referred to as the drive motor, is associated with the electromagnetic means which control the clutch tripping mechanism, and both in this construction of time recording machine and in the construction which employs a synchronous motor for operating the clutching means, the drive motor is used to drive a type wheel unit for time printing an inserted card. A control drum, or so-called program drum, driven by the drive motor is sometimes employed to control the sequential operation of various parts of the machine.

Other objects of the invention will be pointed out in the following description and claims and illustrated in the accompanying drawings, which disclose, by way of examples, the principle of the invention and the best mode, which has been contemplated, of applying that principle.

In the drawings:

Figures 2 and 3 are fragmentary views showing components of the protective system in relative positions which may be assumed thereby during operation of the time recorder, and Figure 4 is a fragmentary view of part of the protective system, looking in the direction of arrow A, Figure 1.

Figure 1:
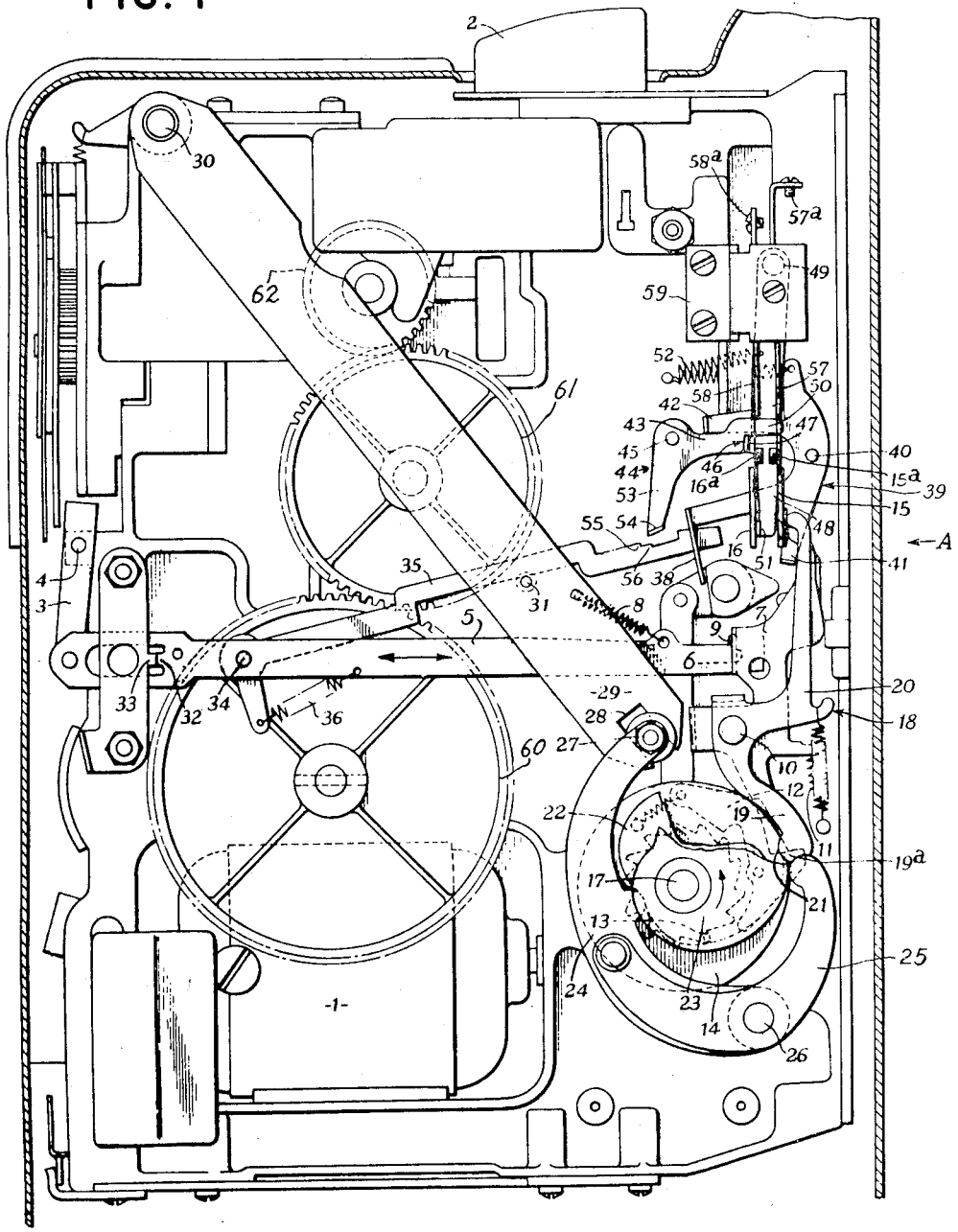
Figure 1 is a view of one end of a time recorder furnished with a motor protective system according to this invention, the components being shown in inoperative positions assumed when the time recorder is at rest.

The time recorder partially illustrated in Figure 1 of the accompanying drawings is of the known construction already referred to in which, upon engagement of clutching means, a drive motor 1 is adapted to operate a type wheel unit, consisting of a minute wheel 60, an hour wheel 61, and a day wheel 62, each of these wheels being advanced at the proper time by positive drive from said motor. In this construction of time recorder a rotatable program drum (not shown) is also advanced by the drive motor 1 concurrently with the advance of the minute type wheel, and this program drum is provided with operating elements which cooperate with associated mechanism to initiate various program operations of the machine at different times as desired. An automatic registration on a time card is effected by inserting a card a proper distance in a card receiver 2 and exerting a slight downward pressure on the card, whereupon the inserted card operates mechanism which causes the tripping of a print hammer to effect a printing operation. Further clutching means then becomes engaged and the hammer is restored to its latched position by power driven mechanism. While the time recorder is in operation, minute impulses from a master clock or other timing device effect the energization of a solenoid which causes the solenoid plunger to rock a lever 3 about its pivot 4 so that the lower tip of this lever is moved to the right, as viewed in Figure 1, carrying with it a latch arm 5. The travel of the solenoid plunger and hence of the lever 3 is limited by an adjustable stop (not shown). As the latch arm 5 moves to the right, it slides longitudinally through a slot 6 in a latch member 7, and then it is tilted by the action of a spring 8 to engage the top edge of slot 6. In this position, a latch point 9 on the latch arm 5 is located behind the top edge of slot 6 and in contact therewith. No movement is imparted to the latch member 7 by this forward shift of the latch arm 5.

The impulse which energizes the above-mentioned solenoid is of a brief duration, for instance, approximately two seconds, and immediately upon the termination of this impulse the solenoid becomes de-energized, whereupon the spring 8 urges the latch arm 5 backwards, that is, to the left in Figure 1, thus causing the latch member 7 which is now engaged with the latch arm 5 by the latch point 9 to be rocked counterclockwise about its pivot pin 10 against the opposition of a tension spring 11. Consequently the lower portion of the latch member 7 is moved to permit a spring-biased pawl 12 to drop into engagement with a ratchet 13, said pawl 12 being pivotally mounted on a substantially circular disc cam 14, so that the engagement of the pawl 12 with the ratchet 13 has the effect of connecting the cam 14 to said ratchet.

The upper end of latch member 7 operates a pair of contact blades 15, 16 to complete the circuit of the drive motor 1, this circuit being so constituted that upon the closing of contact 15a, 16a carried by said blades 15, 16 respectively the motor 1 operates through gearing to rotate a shaft 17 on which is secured the ratchet 13. The cam 14 is loosely and concentrically mounted on the same shaft 17, but since the pawl 12 is now engaged with the cam 14, the latter is also carried round as the shaft 17 is rotated by the motor 1. A cam follower lever 18 shaped like a bell-crank, and pivoted on pin 10 has one limb 19 adapted to ride on the periphery of cam 14. The extremity 19a of the follower limb 19 is normally positioned in a recess 21 in the periphery of the cam 14 so that when, during rotation of the cam 14, the limb extremity 19a rides up out of said recess 21, the contacts 15a, 16a are maintained closed during the course of one revolution of said cam 14 by the pressure thereon of the other limb 20 of cam follower 18.

Fixed side by side to the outer face of concentric cam 14 are two eccentric cams 22, 23 which cooperate respectively with rockers 24, 25 both pivoted on a pivot pin 26. The rocker 24 carries on its extremity a stud 27 adapted to cooperate with a slot 28 in the end of lever 29, so as to operate this lever 29 during rotation of the cams 14, 22 and 23. The upper extremity of the lever 29 is rockable on a fixed pivot pin 30 and is provided with a knock-off stud 31 which moves down on the latch arm 5 during the course of its operation so as to cause the latch point 9 on this arm 5 to be moved clear of the top edge of the slot 6 in the latch member 7. The spring 11 then restores the latch member 7 to its normal position and the latch arm 5 is carried backwards until a projection 32 on the latch arm 5 strikes against a fixed stop 33, the solenoid plunger also being restored to its normal position through the connecting arm 3.

Up to this point it has been described how the energization of a solenoid by a minute impulse causes a clutch of a known construction of time recorder to engage and thus operate the drive motor 1, the effect of which is to rotate a type wheel unit through mechanism which need not be particularly described herein. The drive motor 1 also advances a recording mechanism one minute, and restores a card printing mechanism. The motor 1 coasts to a stop upon contacts 15a, 16a being opened.

A number of other latches or equivalent components are arranged colaterally with the limbs of the latch member 7 and the cam follower 18 which may be made to bear upon and flex the contact blade 15, each of such other latches or equivalent components being operated by cams or otherwise and in a desired sequence according to the function of the part or assembly of the time recorder with which the particular latch or equivalent component is associated.

From the foregoing brief description of parts of a known construction of time recorder the reciprocatory latch arm 5 will readily be identified as the hereinbefore mentioned "operating part having a periodic translatory movement."

This time recorder is a typical instance of a motorized machine where during ordinary use of the machine the drive motor may be switched on practically simultaneously with the initiation of some other, and often conflicting operation, or where for some other reason the drive motor stalls because circuit-controlling contacts are maintained closed instead of moving to the circuit open position.

In the known time recorder referred to, the drive motor 1 functions normally when either of two causes take effect. The first cause obtains, in a manner already briefly described herein, during reception of a "one-minute" impulse from a master clock or other time device. The other occasion is when the time recorder is operated on insertion of a card for time registration purposes. The ultimate result of either occurrence is for one or more of a set of pivoted control latch members including the latch member 7, to move with a view of bringing the two switch blades, 15, 16 into conductive contact so as to close the motor circuit, the moved latch member or members remaining pressed against the closed switch blades 15, 16 through one complete cycle of the time recorder, which generally requires a period of just over one second, and certainly not more than two or three seconds. Normally at the end of te time recorder cycle the moved latch member or members reverts to its inoperative position, thus opening the motor circuit. The present invention provides for use with such an arrangement a motor protective system in the form of a mechanical interlock or contact breaker, by means of which the said latch member or members is or are placed under the influence of the periodically reciprocating part, namely, the latch arm 5, which as already described is reciprocated electromagnetically at one minute intervals. Referring again to Figure 1, near the end of the latch arm 5 remote from the latches is mounted by a pivot pin 34 a trip rod 35 which is arranged in divergent or V relation to the latch arm 5. The trip rod 35 is connected to the latch arm 5 by a tension spring 36 with the result that the trip rod 35 is resiliently biased and tends to move away from the latch arm 5 to bring the outer end of the trip rod 35 into engagement with a slot 37 (Figure 4) in the cranked extremity of one limb 38 of a multi-limbed pivoted lever 39. This multi-limbed lever 39 is mounted on a pivot pin 40 and has a second limb 41 provided with a cranked extremity which occupies a common blocking attitude with respect to all latch levers employed, including the latch member 7, and with respect to the cam follower 18. The lever 39 has a third limb 42 provided with a cranked extremity which normally bears upon one arm 43 of a bell crank 44. The bell crank 44 is mounted on a pivot pin 45, and the arm 43 of said bell crank 44 which is contacted by the third limb 42 of the multi-limbed lever 39 is provided with an abutment face 46 constituting, for preference, an arcuate or sectoral cam having the centre of its radius of curvature substantially coincident with the centre of the pivot pin 45 of the bell crank 44. The bell crank abutment face 46 cooperates with a knee lug 47 on a control bar 48 which is suspended on a pivot pin 49. An extension 50 of arm 43 of bell crank 44 normally rests on the control bar lug 47. The control bar 48 has also a toe lug 51 adapted to bear upon contact blade 15 for the purpose of separating the contact blades 15, 16. The abutment face 46 of the bell crank 44 by cooperation with the knee lug 47 of the control bar 48 prevents separation by said control bar of contact blades 15, 16 closed by the latch member 7 and other latch members to result in opening of the motor circuit, despite resistance by a biasing spring 52 connected to the control bar 48. The other arm 53 of the bell crank 44 terminates in a lug 54 adapted to cooperate as described later, with a step or with one or other of a series of steps, for example, steps 55 and 56 on the trip rod 35.

The contact blades 15, 16 are attached to mounting bars 57, 58 respectively clamped to a bracket 59, the upper ends of said bars 57, 58 carrying terminal screws 57a, 58a respectively by which to connect the blades 15, 16 conductively in the circuit of drive motor 1.

The operation of the mechanical interlock or contact breaker described above is as follows: Under normal conditions the movement of at least one of the latch members, such as latch member 7, effected in any desired manner, toward the switch-contacting position causes the multi-limbed lever 39, by reason of the latch blocking attitude of its limb 41 to lift the extremity of limb 42 of said lever 39 clear away from the arm 43 of the bell crank 44 and also to lift the lug 54 on limb 53 of said bell crank 44 slightly away from the stepped outer end of the trip rod 35, said rod 35 being carried bodily toward the contact blades 15, 16 and the associated latch members by the latch arm 5, which is moved once every minute. Normally the moved latch member, such as latch member 7, is restored following each machine cycle, which as already noted occupies a period of just over one second, so that when at minute intervals the trip rod 35 is carried along with the latch arm 5 the trip rod 35 does not engage the lug 54 of limb 53 of bell crank 44. In the event, however, of one or more of the latches failing to return to normal following one machine cycle, so that the motor remains energized, the displacement of the pivoted multi-limbed lever 39 by reason of its latch-blocking limb 41 being restrained by the abnormally positioned latch member, causes the lever 39 to swing on its pivot pin 49 and thus free the bell crank 44 from restraint by the lever limb 42, thereby permitting the outer stepped end of the trip rod 35, under influence of its biasing spring 36, to move so as to bring the outermost step 55 of the trip rod 35 into the path of the lug 54 on the limb 53 of the bell crank 44. When, as the result of the next succeeding impulse or equivalent action, the latch arm 5 again moves in the direction of the latches, the engagement of the bell crank lug 54 with the trip rod step 55 will cause the bell crank 44 to rock sufficiently to move it angularly a distance equal to half the arcuate length of the sectoral or cam-like abutment face 46 of the bell crank 44, as shown in Fig. 2. If normal conditions have not meanwhile been restored and at least one of the latches remains in the circuit closing position, the next minute interval movement of the latch arm 5 will bring about engagement between the innermost step 56 of the trip rod 35 and the bell crank lug 54 with the result that the bell crank 44 will be moved a further distance and this time its face 46 will release the biased contact bar 48, as shown in Fig. 3, whereupon the latter will operate to separate the closed switch blades 15, 16 and thus open the motor circuit. It will be appreciated that by employing more steps on the trip rod 35 more than two minute interval movements of the latch arm 5 must needs be performed before the bell crank 44 releases the switch-breaking contact bar 48.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a switch actuating device, an operating arm having a periodic translatory movement, a rod movable with said arm, a switch including a pair of contact closing blades, a latch means under control of said operating arm for engaging with one of said blades to close said switch, a second means engaging the other switch blade to urge said blades apart, a third means engaging with said second means to normally restrain said second means from becoming effective, and a fourth means for normally holding said third means against movement, said fourth means being displaced to release said third means by actuation of said latch means in response to a translatory movement of said operating arm, whereby complete movement of said third means to release said second means from engagement by said third means is effected upon engagement of said third means by said rod following progressive movement of said rod resulting from a predetermined number of translatory movements of said operating arm.

2. In a switch actuating device, an operating arm having a periodic translatory movement, a rod movable with said arm, said rod having two steps thereon, a switch including a pair of contact closing blades, a latch means under control of said operating arm for engaging with one of said blades to close said switch, a second means engaging the other switch blade to urge said blades apart, a third means engaging with said second means to normally restrain said second means from becoming effective, said third means having a lug in the path of said steps when said rod is made effective, and a fourth means for normally holding said third means against movement and said rod ineffective, said fourth means being displaced to release said third means and said rod by actuation of said latch means in response to a translatory movement of said operating arm, whereby complete movement of said third means to release said second means from engagement by said third means is effected upon engagement of said third means by said rod following successive movements of said rod resulting from three translatory movements of said operating arm.

3. In a switch actuating device, an operating arm having a periodic translatory movement, a resiliently biased trip rod movable with said arm, said trip rod having a series of steps thereon, a switch including a pair of contact closing blades, a lever controlled by said operating arm for cooperating with one of said blades to close said switch, a control bar cooperating with the other switch blade to urge said blades apart, a bellcrank cooperating with said control bar to normally restrain said bar from becoming effective, a multi-limbed element having a first limb positioned for engagement by said lever, a second limb normally restraining said bellcrank against full movement, and a third limb engaged by said trip rod to limit the movement of said trip rod in a direction transverse to said translatory movement, said lever when moved to a switch closing position in response to a translatory movement of said operating arm causing a displacement of said element to permit full movement of said bellcrank, said trip rod following the displacement of said element, and complete movement of said bellcrank to release said bar being effected upon engagement of said bellcrank by said steps on said trip rod following progressive movement of said trip rod resulting from a prearranged number of translatory movements of said operating arm.

References Cited in the file of this patent
UNITED STATES PATENTS
2,600,568   Nelson _____ June 17, 1952